United States Patent Office 3,788,974
Patented Jan. 29, 1974

3,788,974
HYDROCRACKING PROCESS UTILIZING MIXED NONNOBLE METAL CATALYST
Fred J. Buchmann and Clarence M. Eidt, Jr., Baton Rouge, Ralph B. Mason, Denham Springs, and Glen P. Hamner, Baton Rouge, La., assignors to Esso Research and Engineering Company
Continuation of application Ser. No. 850,680, Aug. 15, 1969, which is a continuation-in-part of application Ser. No. 640,859, May 24, 1967. This application June 13, 1972, Ser. No. 262,223
Int. Cl. C01b 33/28; C10g 37/02, 13/06
U.S. Cl. 208—59                                                 15 Claims

ABSTRACT OF THE DISCLOSURE

A hydrocracking process which uses a mixed nonnoble metal catalyst composite on a crystalline aluminosilicate zeolite cracking bar. The singular catalyst employed in the process comprises nickel-tungsten on the hydrogen form of a crystalline aluminosilicate zeolite having a uniform pore diameter, a crystal structure that of faujasite and a silica to alumina mole ratio greater than about 3.

RELATED APPLICATIONS

Figure 1:
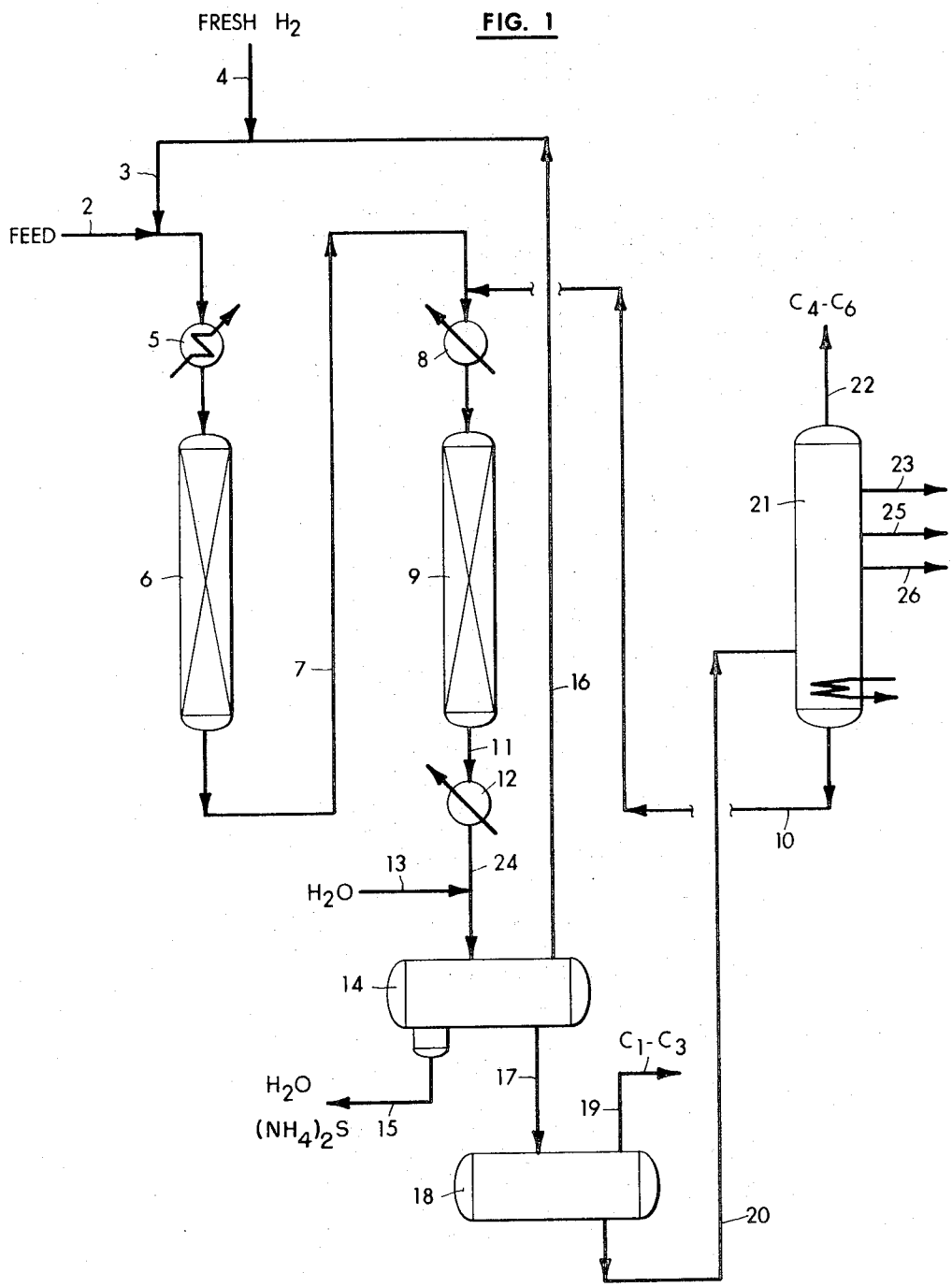

This application is a continuation of Ser. No. 850,680, filed Aug. 15, 1969 which in turn is a continuation-in-part of Ser. No. 640,859, filed May 24, 1967.

BACKGROUND OF THE INVENTION

Early hydrocracking processes utilized various metal hydrogenation components composited with amorphous metal oxide cracking bases. These catalysts suffered from several disadvantages including relatively poor activity and extreme sensitivity to catalyst poisons such as nitrogen compounds present in the feed.

Improvements in the hydrocracking process included second generation catalysts which were superior to the early amorphous metal oxide based catalysts in exhibiting higher activity, improved selectivity to desired products and a higher level of resistance to catalyst poisons which diminished the severity of any prehydrofining step needed and increased the utility of the process vis-a-vis a broader range of feed stocks which could be accommodated. These new catalysts comprise a member of the platinum group of metals as hydrogenation component and a large pore crystalline aluminosilicate zeolite as the cracking base. However, such new catalysts have deficiencies of their own. For example, the price of the platinum group metal is so great that it becomes the largest single factor in the final catalyst cost even though such metals constitute only 0.5 to about 2 wt. percent of the total catalyst by weight.

Thus, it would be of great advantage in a hydrocracking process to utilize a nonnoble metal (nonplatinum group) hydrogenation component on a crystalline aluminosilicate zeolite since the cost of such a catalyst would be substantially lower thereby enhancing the commercial value of the process. Obviously, cost of catalyst alone is not the only determinitive factor in selecting a catalyst for a hydrocarbon conversion process since any savings on the catalyst price may be more than offset by lower catalyst activity or poorer selectivity to desired products. It has not been possible heretofore, to make a practical substitution of a nonnoble metal crystalline aluminosilicate zeolite for a similar platinum group metal containing catalyst due to the former's generally lower intrinsic catalytic activity.

SUMMARY OF THE INVENTION

The present invention is based on the surprising discovery that a singular mixed nonnoble metal hydrogenation component on a specific type hydrogen or hydrogen precursor form crystalline aluminosilicate zeolite base exhibits a substantially higher hydrocracking activity at equivalent selectivity to desirable products than the platinum group metal containing catalysts previously considered to be the most active hydrocracking catalysts available for commercial use.

The specific catalyst utilized in the practice of the present invention is a nickel-tungsten on a hydrogen or a hydrogen precursor (i.e., ammonia ion) form of a crystalline aluminosilicate zeolite having the crystal structure of a faujasite and a silica to alumina mol ratio greater than 3.

DESCRIPTION OF THE PREFERRED EMBODIMENTS

The catalyst employed in the practice of the hydrocracking process of the present invention as indicated previously comprises a nickel-tungsten hydrogenation component composited with a cracking base of a crystalline aluminosilicate zeolite having a faujasite crystalline structure, a uniform pore size structure, and a silica to alumina mol ratio greater than about 3. Zeolites having the desired faujasite structure may be either natural or synthetic and will have a formula which in the dehydrated state, conforms to the following:

$$0.9 \pm 0.2 \, Na_2O:Al_2O_3:XSiO_2$$

where X may be 3 to about 6 or even higher if the zeolite is subjected to selective alumina removal procedures. Suitable procedures for affecting alumina removal from crystalline zeolites are disclosed in copending application S.N. 552,911, filed May 25, 1966, inventors: Paul Earl Eberly, Jr., Sebastian Marc Laurent and Harry Edwin Robson. A particularly preferred form of the crystalline aluminosilicate zeolite is represented by zeolite Y which is commercially available from the Linde Division of Union Carbide Corporation.

In order to be placed in a form useful in the practice of the process of the present invention, the sodium form of the zeolite is modified by cation exchange with hydrogen ion or an ion convertible into hydrogen ion, such as ammonium ion, by exchange procedures now well known in the art. It is generally desirable to replace a sufficient amount of the original sodium ion so that the exchanged zeolite composition has a sodium content of less than 2.0 wt. percent, preferably less than 1.0 wt. percent.

The nickel tungsten hydrogenation component is introduced into the crystalline aluminosilicate zeolite by any one of several alternative methods. For example, it is possible to employ impregnation techniques previously used in the art to prepare nickel-tungsten on amorphous base catalysts. These techniques involve treating the catalyst base with solutions containing nickel and tungsten either separately or in combination in a single solution so as to deposit these catalytic materials on the base surface. See in this regard, U.S. Pats. Nos. 2,690,433; 3,232,-887 and 3,280,040 for description of procedures used in introducing nickel and tungsten onto various types of catalyst support materials.

It is also possible to prepare the nickel-tungsten catalyst by introducing the nickel into the cation-exchange sites of the sodium or more preferably the ammonium form of the crystalline aluminosilicate zeolite. This is accomplished by treating the zeolite with an aqueous solution of an exchangeable nickel salt such as nickel chloride. The resulting nickel exchanged ammonium zeolite is then treated with an ammonium tungstate solution to yield a dispersed nickel-tungsten composite at or near the exchange sites of the ammonium form of the aluminosilicate. This may then be decomposed to yield a nickel-tungsten on the hydrogen form of the alumino-silicate zeolite.

While the method of preparation of catalysts is not critical to their operability in a single stage or two-stage hydrocracking process of the present invention, it is believed that the latter procedure utilizing a first exchange step with nickel ion followed by treatment with ammonium tungstate results in catalysts exhibiting superior activity maintenance properties and thus such procedure of preparation would be preferred.

In any event, the preparative procedure should result in a catalyst containing from 1 to 8 wt. percent, preferably 2 to 6 wt. percent nickel (based on the metallic form although not necessarily existing as such) and from 3 to 18 wt. percent, preferably 6 to 12 wt. percent of tungsten (based on the metal as above).

Suitable feed stocks for use in the hydrocracking process of the present invention include the following: hydrocarbon fractions boiling over the full range from 375° F. to 1000° F. or more, especially from about 400° F. to 800° F., or fractions therefrom, containing organic nitrogen compounds to the extent of 0.01 to 0.5% N and sulfur compounds to the extent of 0.2 to 4.0% S. These fractions may be derived from virgin petroleum stocks or from catalytically cracked cycle stocks or from other processes in the conversion of crude petroleum oil to useful products.

While raw feed stocks may be employed in some instances, in most cases it is preferable to employ a hydrofining pretreatment to effect at least partial desulfurization, denitrogenation, stabilization, etc. Where the feed stock contains substantial quantities of nitrogen compounds, it may be preferable to employ two stages of hydrocracking. The hydrofining treatment in this instance may be of the "integral" type, i.e. wherein the entire hydrofiner effluent is passed directly through the first hydrocracking stage without intervening condensation or purification.

Suitable catalysts for use in hydrofining feed stocks for the practice of the present invention include, for example, mixture of the oxides and/or sulfides of cobalt and molybdenum, or of nickel and tungsten, preferably supported on a carrier such as alumina, or alumina containing a small amount of coprecipitated silica gel. Other suitable catalysts include, in general, the oxides and/or sulfides of the Group VI–B and/or Group VIII metals, preferably supported on adsorbent oxide carriers such as alumina, silica, titania, and the like. The hydrofining operation may be conducted either adiabatically or isothermally, and under the following general conditions:

|  | Hydrofining conditions | |
|---|---|---|
|  | Operative | Preferred |
| Temperature, ° F | 600–850 | 650–750 |
| Pressure, p.s.i.g | 500–3,000 | 800–2,000 |
| LHSV, v./v./hr | 0.3–10 | 0.6–5 |
| $H_2$/oil ratio, s.c.f./b | 500–20,000 | 1,000–10,000 |

When utilizing a single-stage hydrocracking process, the hydrofiner effluent is fed to a hydrocracking reactor which contains a fixed bed of the nickel-tungsten on hydrogen faujasite catalyst. The reaction conditions employed in the single-stage reactor are summarized below:

|  | Single-stage hydrocracking conditions Ni-W-faujasite catalyst | |
|---|---|---|
|  | Operative | Preferred |
| Temperature, ° F | 600–850 | 650–800 |
| Pressure, p.s.i.g | 500–3,000 | 800–2,000 |
| LHSV, v./v./hr | 0.3–10 | 0.6–4.0 |
| $H_2$/oil ratio, s.c.f./b | 1,000–20,000 | 2,000–10,000 |

However, as indicated previously, it may also be desired to utilize a two-stage hydrocracking process. In such a case, the nickel-tungsten on hydrogen faujasite catalyst may be utilized in the first hydrocracking stage or in certain cases, may be employed in both stages at different operating conditions. If high value is placed on liquid products ($C_5$–400° F. B.P.) and low value on gaseous products ($C_4$ and lighter) then it may be desirable to use a relatively low temperature, two-stage hydrocracking process with the high activity, nickel tungsten-faujasite catalyst in both hydrocracking stages. In this case the second stage would require sufficient $H_2S$ in the circulating gas to maintain the catalyst in the sulfided form. In still another case, especially if the feed stock is low in nitrogen (ca. 300 p.p.m. N or less), it may be possible to eliminate the preliminary hydrofining step and use a two-stage hydrocracking process. In either case, ammonia removal and some $H_2S$ removal would be conducted between the two hydrocracking stages.

If another catalyst should be employed in the second stage of a two-stage process, it may consist of any desired combination of a refractory cracking base with a suitable hydrogenating component. Suitable cracking bases include for example, mixtures of two or more difficultly reducible oxides such as silica-alumina, silica-magnesia, silica-zirconia, alumina-boria, silica-titania, silica-zirconia-titania, acid-treated clays and the like. The preferred cracking bases comprise partially dehydrated zeolitic, crystalline molecular sieves, e.g. of the X or Y crystal types, having relatively uniform pore diameters of about 8 to 14 angstroms, and comprising silica, alumina and one or more exchangeable zeolitic cations.

The process conditions utilized in the fixed hydrocracking stage of a two-stage hydrocracking process are summarized below:

|  | First-stage hydrocracking conditions | |
|---|---|---|
|  | Operative | Preferred |
| Temperature, ° F | 600–850 | 650–775 |
| Pressure, p.s.i.g | 500–3,000 | 800–2,000 |
| LHSV, v./v./hr | 0.3–10 | 0.6–5.0 |
| $H_2$/oil ratio, s.c.f./b | 1,000–20,600 | 2,000–10,000 |

For the second stage hydrocracker the following process conditions are employed:

|  | Second-stage hydrocracking conditions | |
|---|---|---|
|  | Operative | Preferred |
| Temperature, ° F | 500–750 | 550–700 |
| Pressure, p.s.i.g | 500–3,000 | 800–2,000 |
| LHSV, v./v./hr | 0.3–10 | 0.6–5.0 |
| $H_2$/oil ratio, s.c.f./b | 1,000–20,000 | 2,000–10,000 |

It should be noted that the above conditions are utilized for either the conventional hydrocracking catalysts or the nickel-tungsten on hydrogen faujasite catalyst of the present invention. However, due to the latter catalysts superior activity, higher throughputs are possible at equivalent temperature and pressure conditions for the conventional catalysts.

Reference is now made to the attached FIG. 1, which is a flow sheet illustrating the single-stage hydrocracking process embodiment of the present invention. In the succeeding description, it will be understood that the drawing has been simplified by the omission of certain conventional elements such as valves, pumps, compressors, and the like.

The initial feed stock is brought in via line 2, mixed with recycle and make up hydrogen from line 4 via line 3, preheated to incipient hydrofining temperature in heater 5, and then passed directly into hydrofiner 6, where catalytic hydrofining proceeds under substantially conventional conditions indicated above.

The total hydrofined product from hydrofiners 6 is withdrawn via line 7 and transferred via heat exchanger 8 to the hydrocracker reactor 9 without intervening condensation or separation of products. Heat exchanger 8 is for the purpose of suitably adjusting the temperature of the feed to hydrocracker 9; this may require either cooling or heating, depending upon the respective hydrofining and hydrocracking temperatures employed. Suitable hydrocracking conditions for use in a single stage hydrocracking process have been given above.

The effluent from hydrocracker 9 is withdrawn via line 11, condensed in condenser 12, then mixed with wash water injected via line 13 into the line 24 and the entire mixture is transferred to high-pressure separator 14. Sour recycle hydrogen is withdrawn via line 16, and aqueous wash water containing dissolved ammonia and some of the hydrogen sulfide (in the form of ammonium sulfide) is withdrawn via line 15. The liquid hydrocarbon phase in separator 14 is removed via line 17, and the mixture is flashed in low-pressure separator 18, from which flash gases comprising methane, ethane, propane and the like are withdrawn via line 19. The liquid hydrocarbons in separator 18 are transferred via line 20 to fractionating column 21. The sour hydrogen gas in line 16 may be recycled to the hydrofining zone via line 3.

In the fractionator 21 the overhead cut removed via line 22 may comprise a $C_4$–$C_6$ fraction. Side stream cuts may be removed through lines 23, 25 and 26. These cuts may comprise gasoline fractions, kerosene and middle distillate products. The fractionator bottoms are removed via line 10 and may be recycled to the hydrocracker 9.

Figure 2:
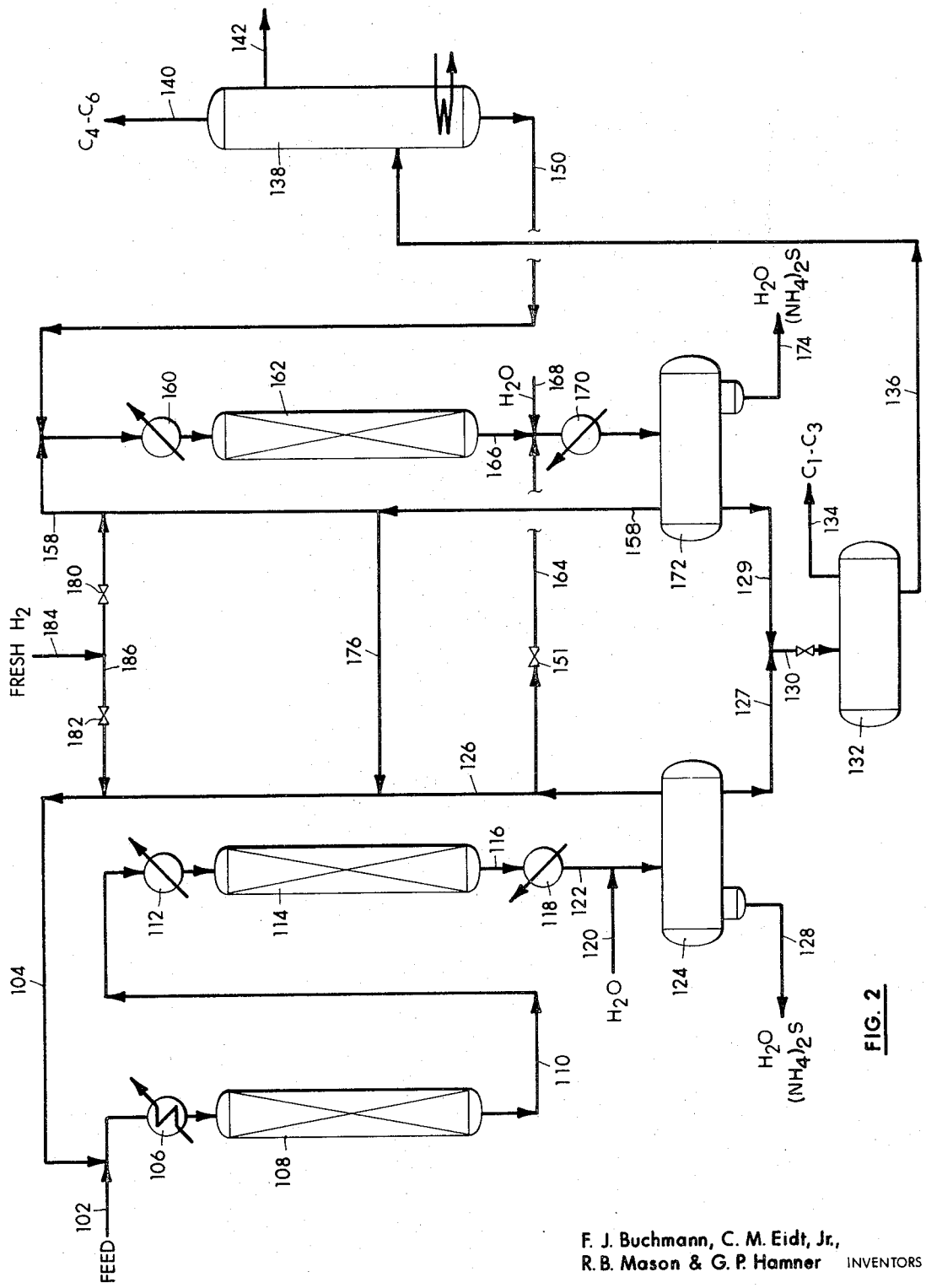

Reference is now made to FIG. 2, which is a flow sheet illustrating the invention in its two-stage hydrocracking adaptation.

As in the case of the single stage embodiment, the initial feed stock is brought in via line 102, mixed with recycle and make up hydrogen from line 104, preheated to incipient hydrofining temperature in heater 106, and then passed directly into hydrofiner 108, where catalytic hydrofining proceeds under substantially conventional conditions.

The total hydrofined products from hydrofiner 108 are withdrawn via line 110 and transferred via heater exchanger 112 to first-stage hydrocracker 114, without intervening condensation or separation of products. Heat exchanger 112 is for the purpose of suitably adjusting the temperature of feed to hydrocracker 114; this may require either cooling or heating, depending upon the respective hydrofining and hydrocracking temperatures employed. Inasmuch as first-stage hydrocracker 114 and hydrofiner 118 are preferably operated at essentially the same pressure, it is entirely feasible to enclose both contacting zones within a single reactor.

The effluent from hydrocracker 114 is withdrawn via line 116, condensed in condenser 118, then mixed with wash water injected via line 120 into line 122 and the entire mixture is then transferred to high-pressure separator 124. Sour recycle hydrogen is withdrawn via line 126, an aqueous wash water containing dissolved ammonia and some of the hydrogen sulfide (in the form of ammonium sulfide) is withdrawn via line 128. The liquid hydrocarbon phase in separator 124 is removed via line 127, blended with the second-stage product condensate from line 129, and the mixture is then flashed via line 130 to low-pressure separator 132 from which flash gases comprising methane, ethane, propane and the like are withdrawn via line 134. The liquid hydrocarbons in separator 132 are transferred via line 136 to fractionating column 138.

The fractionating column 138 may be operated primarily for the purpose of recovering gasoline and an uncoverted gas oil feed for the second stage hydrocracker. Light gasoline, boiling up to the $C_6$ range is normally taken off as overhead via line 140. The $C_{7+}$ gasoline is withdrawn as a side cut via line 142. The bottoms from column 138 constitutes the primary feed stock for the second-stage hydrocracking, and is withdrawn via line 150 for that purpose. The second-stage feed stock in line 150 is mixed with recycle and make up hydrogen from line 158, preheated to incipient hydrocracking temperatures in heater 160 and passed into second-stage hydrocracker 162. This feed stock differs considerably from the feed in the first-stage hydrocracker, in that it is substantially free of nitrogen compounds and sulfur compounds. The choice is thus presented of operating the second stage with or without significant amounts of sulfur being present. In the modification illustrated, the desired mid-run shift in sulfur concentration in hydrocracker 162 is obtained by the alternate use of separate and mixed hydrogen recycle gas systems from hydrocrackers 114 and 162.

The recycle gas from separator 124 normally contains a substantial proportion of hydrogen sulfide which was not removed by the previous water-washing operation. To operate hydrocracker 162 with added hydrogen sulfide, valve 151 is opened sufficiently to permit the desired proportion of sour recycle gas in line 126 to flow through line 164 to reactor effluent line 166, where it mingles with the total effluent from hydrocracker 162. By adding the cool recycle hydrogen at this point, a partial quench of the hot effluent in line 166 is effected.

An additional water wash may also be utilized in line 166 in order to remove traces of ammonia remaining in the sour recycle gas, the water being added via line 168. The resulting mixture is then passed through condenser 170 and into high-pressure separator 172, from which the total recycle gas for reactor 162 is removed via line 158. Spent wash water containing ammonium sulfide is removed via line 174. The washing at this stage will remove some of the hydrogen sulfide but most of it remains in the recycle gas in line 158. In order to prevent the build-up of light hydrocarbons and/or excess hydrogen in the recycle system for hydrocracker 162, a bleed line 176 is provided to permit withdrawal of a bleed stream of total recycle gas from line 158 back to line 126. In cases where excess hydrogen is supplied via line 164 requiring a bleed via line 176, fresh make up hydrogen is ordinarily not required in hydrocracker 162. In that case, make up hydrogen supply valve 180 may be closed and valve 182 opened, thereby permitting the total fresh hydrogen supply for the system to flow via line 184 and 186 to the first-stage recycle line 126. In cases where the sour bleed stream in line 164 is insufficient to supply all the make up hydrogen for hydrocracker 162, valve 180 will be partially opened in order to permit some of the fresh hydrogen from line 184 to flow into recycle line 158.

To operate hydrocracker 162 in the absence of sulfur (separate recycle systems) valve 151 is closed and valve 180 opened, sufficiently to supply the necessary make up hydrogen. In one mode of operation, during the sweet cycle of operation valve 182 may be closed completely, thus diverting all of the fresh hydrogen through valve 180 and line 158. In this case, the make up hydrogen for hydrocracker 114 is bled off through line 176 from line 158. This mode of operation presents the advantage of providing a continuous purge of small amounts of hydrogen sulfide formed in the hydrocracker 162 to the recycle system of hydrocracker 114.

The process of the present invention may be more clearly understood by reference to the following examples.

EXAMPLE 1

This example demonstrates the preparation of a nickel tungsten on hydrogen faujasite catalyst useful in the present inventive process. Alternate methods of preparing this catalyst are shown.

Preparation A

For this preparation a nickel faujasite (zeolite-Y) prepared by the nickel exchange of ammonium faujasite was reacted with an ammonium tungstate solution. The exchange of the ammonium faujasite with nickel was employed because nickel does not exchange as readily and as completely with the sodium form as other cations, e.g. zinc and ammonium ions. An alternate to the double ion exchange, i.e. the ammonium ion and the nickel ion is the exchange with ammoniacal nickel salt solutions to reduce the sodium ion to an acceptable level. In the preparation of the superior nickel tungstate catalyst, a charge of 500 grams of sodium faujasite was first converted to the ammonium ion modification by suspension in 1000 cc. of water and, while agitating at room temperature, a solution of one pound of ammonium chloride in 1500 cc. of water was added and agitation was continued for four hours. The treating solution was removed by filtration and the wet cake was water washed upon transfer to 2000 cc. of water and agitation for one hour. Using the wet cake from filtration following the wash after the first exchange a second and then a third exchange was made with fresh ammonium chloride solutions as in the first instance, except that three water washes were employed after the third exchange. The three-fold ammonium ion exchanged and washed faujasite was air dried on the filter for subsequent exchange with nickel ion.

This ammonium faujasite was suspended in 1000 cc. of water and a solution of one pound of nickelous chloride in 1500 cc. of water was added, while agitating thoroughly with a mechanical stirrer, and agitation was continued for four hours at room temperature. As in the ammonium ion exchange, three such exchanges were made with fresh nickelous chloride as in the first instance with one water wash each after the first and second exchanges and three water washes after the third exchange. These washes consisted of suspension of the wet cake from the previous filtration in 2000 cc. of water and agitation for one hour at room temperature followed by filtration to remove the treating solution and/or wash water. The three-fold and washed nickel faujasite was reacted with ammonium tungstate solution as follows:

A charge of 100 grams of tungstic acid was treated with 1000 grams of concentrated ammonium hydroxide for two hours at 150° F. Thereupon, excess ammonia was removed by evaporation at about 200° F. until about 500 cc. remained. The solution was diluted to 3000 cc. which was sufficient to maintain complete solution at 150° F. This ammonium tungstate solution at 150° F. was transferred to a 5-liter flask equipped with a sealed stirrer and the nickel faujasite, described above, was added in small increments while stirring. Agitation was continued for 24 hours at about 150° F. using a reflux condenser to prevent evaporation losses. Thereupon, the treating liquid was removed by filtration and the filter cake was dried overnight in a vacuum oven at 150° F. This catalyst possessed about 87% of the faujasite crystallinity as evaluated by X-ray determination and by chemical methods analyzed as follows:

Ni, wt. percent _____ 5.8
W, wt. percent _____ 9.9
Sodium, wt. percent _____ 1.95

Since the atomic ratio of nickel to tungsten is 1.8, it is concluded that the catalyst consists of hydrogen-nickel faujasite together with an intimate dispersion of nickel tungstate at or near the exchange sites.

Preparation B

This preparation utilizes an impregnation technique for preparing the nickel tungsten catalyst of the present invention. Such a catalyst was prepared by impregnating 145 grams of a moist cake of ammonium faujasite (zeolite-Y) having a concentration of 1.7 wt. percent Na, 84.0% $SiO_2$ and 15.4% $Al_2O_3$ with a solution containing 29.7 grams of nickelous nitrate $(Ni(NO_3)_2 \cdot 6H_2O)$ in 25 cc. of water. Thereupon, a solution of 14.7 grams of ammonium metatungstate in 25 cc. of water was added and the resulting paste was heated on a hot plate until the gummy characteristic was removed and then the catalyst cake was dried overnight at 212° F. in a vacuum oven. The catalyst analyzed 5.9% nickel, 10.3 wt. percent W, an d1.7% Na and by X-ray analysis retained 86.0% of the faujasite crystallinity.

Preparation C

The base catalyst used in preparation B consisting of 14.5 grams of ammonium faujasite, containing 1.7 wt. percent Na, 84.0 wt. percent $SiO_2$ and 15.4 wt. percent $Al_2O_3$ was exchanged with sufficient nickel in the form of nickelous nitrate $(Ni(NO_3)_2 \cdot 6H_2O)$ to introduce 6.3 wt. percent Ni into the catalyst. It was then impregnated with a sufficient amount of ammonium metatungstate solution to add 9.2 wt. percent tungsten to the catalyst. The final catalyst contained 1.3% Na.

Preparation D

The base catalyst used in preparations B and C was mixed with 20% $SiO_2$-$Al_2O_3$ binder, pilled and steamed for 1 hour at 1100° F. and then exchanged with nickel and impregnated with tungsten as in preparation C. The final catalyst contained 1.4 wt. percent Ni, 9.2 wt. percent W, and 0.6% Na.

EXAMPLE 2

This example demonstrates the unexpectedly high activity exhibited by the nickel tungsten on hydrogen faujasite catalyst used in the present invention when compared with other mixed nonnoble metal catalyst composition in the hydrocracking of the heavy mixed naphtha feed stock. For the purposes of further comparison, results obtained with the use of a palladium on hydrogen form faujasite in the hydrocracking of the same feed stock have also been included. The data for the above representative catalysts in comparable hydrocracking runs are summarized in Table I.

TABLE I.—COMPARATIVE ACTIVITY FOR HYDROCRACKING OF LIGHT CATALYTIC CYCLE OIL

[Conditions: 1,000 p.s.i.g., 2-4000 s.c.f. $H_2$/b]

| | | | Product distribution and quality | | |
|---|---|---|---|---|---|
| Catalyst components [3] | Temp., °F. | V./mg./v. | $C_4$, vol. percent | $C_5$-430° F. fraction | RON plus 3 cc. of TEL. $C_5$-430° F. fraction |
| Ni-W-H-faujasite [1,2] | 740 | 5 | 17.5 | 48.1 | 99.0 |
| Ni-Mo-H-faujasite [2] | 720 | 1 | 24.6 | 83.4 | 98.5 |
| Co-Mo-H-faujasite [2] | 712 | 1 | 25.1 | 82.2 | 98.1 |
| Co-W-H-faujasite [2] | 715 | 1 | 15.8 | 60.0 | 98.4 |
| Pd-H-faujasite | 734 | 1 | 7.8 | 68.2 | 80.0 |

[1] Prepared by procedure A of Example 1.
[2] Ammonium faujasite used as starting base material.
[3] All nonnoble metal components present in approximately the same molar amounts and all catalysts sulfided prior to use.

The nickel-tungsten on hydrogen faujasite catalyst is utilized at five times the feed rate used for the other catalysts and still gives desirable yields of $C_4$ and gasoline. This is particularly exemplified by comparing the nickel-tungsten catalyst with the Pd-H-faujasite type catalyst which is a highly preferred catalyst of the prior art. Further, the nonnoble metal catalyst gave a much higher octane product than the Pd-H-faujasite catalyst.

EXAMPLE 3

A further direct comparison of the activity of the nickel-tungsten-faujasite catalyst with that of the Pd-faujasite was obtained at exactly comparable conditions. For the feed in this test, a highly hydrofined light catalytic cycle oil was used after adding Sack 1000 p.p.m. N in the form of n-butylamine, and 3000 p.p.m. S in the form of thiophene. Since the nitrogen and sulfur in these compounds are readily converted to $MH_3$ and $H_2S$ respectively, this type of feed closely simulates conditions in the hydrocracking reactor immediately following the hydrofining reactor in either a single stage of a two-stage process. The following tabulation shows the markedly enhanced activity of the nickel-tungsten catalyst and further shows the remarkable improvement steaming makes.

TABLE II

[Conditions: 1,500 p.s.i.g.; 8,000 s.c.f. $H_2$/B.: 1.0 v./hr./v. Feed: Hydrofined light catalytic cycle oil spiked to 1,000 p.p.m. and 3,000 p.p.m. S.]

| Catalyst | Temp., °F. | Conversion to 100° F. minus product, vol. percent | Relative reaction rate constant | Relative activity [a] |
|---|---|---|---|---|
| Ni-W-H-faujasite [b] | 685 | 64 | 0.220 | 147 |
| Ni-W-S-faujasite [c] | 730 | 90-94 | | 265 |
| Pd-H-faujasite | 654 | 41 | 0.150 | 100 |

[a] Relative percent activity with Pd-H-faujasite assigned 100% as a standard reference.
[b] Prepared by procedure A of Example 1.
[c] Prepared by procedure D of Example 1.

EXAMPLE 4

The nickel-tungsten-H-faujasite catalyst of the present invention was compared with the same catalyst in which the hydrogen in the faujasite was exchanged with rare earths. The rare-earth catalyst thus obtained is the equivalent of the catalyst described in U.S. Pat. 3,210,267 issued Oct. 5, 1965, to Plank. See for example column 28, lines 27–47 of said patent. This example affords a direct comparison between the catalysts of this invention and those of the said patent. A comparison with a catalyst containing zeolite-X-matrix is included for completeness.

In this test a light catalytic cycle oil containing 3000 p.p.m. sulfur added as thiophene and 1000 p.p.m. nitrogen added as n-butyl amine was hydrofined at 665° F., 1500 p.s.i.g., 8000 s.c.f. $H_2$/Bbl. and a space velocity of 1.0 v./hr./v. The following results were obtained:

| Catalyst | Relative activity |
|---|---|
| Ni-W-H-Y-Faujasite [a] | 100 |
| Same as above exchanged with rare earth | 50 |
| Ni-W-H-Y-Faujasite [b] | 45 |

[a] Prepared by Method A of Example 1.
[b] Prepared by Method A of Example 1 using X-zeolite as base at 689° F.

The above data show that the catalyst of the present invention containing no rare earths is twice as active as the catalyst containing rare earths. It is also to be noted that the catalyst using zeolite-X as the base and containing no rare earths was even worse giving only 45% activity compared to the Ni-W-H-Y faujasite.

The nature of the present invention having thus been fully described and illustrated and specific examples of the same given, what is claimed as new, useful and unobvious and desired to be secured by Letters Patent is:

1. A hydrocracking process comprising contacting a hydrocarbon oil feedstock containing from about 0.01 to 0.5 wt. percent nitrogen compounds in a first hydrocracking zone, in the presence of hydrogen at hydrocracking conditions, with a crystalline aluminosilicate zeolite catalyst having hydrogen cations in at least a portion of its exchangeable cationic sites, said zeolite having uniform pore diameters, a crystal structure that of faujasite, a silica to alumina mole ratio greater than 3 and containing less than about 2 wt. percent sodium, said catalyst having associated therewith a hydrogenation component comprising from about 1 to 8 wt. percent nickel material, calculated as metal, and from about 3 to 18 wt. percent tungsten material, calculated as metal, passing said hydrocarbon oil feed stock after contact with said catalyst to a second separate hydrocracking zone and contacting the same in said zone with hydrogen at hydrocracking conditions with a hydrocracking catalyst.

2. The process of claim 1 wherein the catalyst employed in said second hydrocracking zone is a crystalline aluminosilicate zeolite catalyst having hydrogen cations in at least a portion of its exchangeable cationic sites, said zeolite further having uniform pore diameters, a crystal structure that of faujasite, a silica to alumina mole ratio greater than 3 and containing less than about 2 wt. percent sodium, said catalyst having associated therewith a hydrogenation component comprising from about 1 to 8 wt. percent nickel material, calculated as metal, and from about 3 to 18 wt. percent tungsten material, calculated as metal.

3. The process of claim 1 wherein at least a portion of the nickel and tungsten material of the catalyst employed in said first hydrocracking zone is present in a sulfided form.

4. The process of claim 2 wherein at least a portion of the nickel and tungsten materials of the catalysts employed in said first and second hydrocracking zones is present in a sulfided form.

5. The process of claim 1 wherein said catalyst contains a silica-alumina binder.

6. The process of claim 5 wherein at least a portion of the nickel and tungsten materials of the catalyst employed in said hydrocracking zone is present in a sulfided form.

7. A hydrocracking process comprising contacting a hydrocarbon oil feedstock containing from about 0.01 to 0.5 wt. percent nitrogen compounds with a hydrofining catalyst in a hydrofining zone in the presence of hydrogen at hydrofining conditions, passing the effluent from said hydrofining zone, without intervening condensation or purification, to a hydrocracking zone and contacting said effluent, in the presence of hydrogen and at hydrocracking conditions, with a crystalline aluminosilicate zeolite catalyst having hydrogen cations in at least a portion of its exchangable cationic sites, said zeolite further having uniform pore diameters, a crystal structure that of faujasite, a silica to alumina mole ratio greater than 3 and containing less than about 2 wt. percent sodium, said catalyst having associated therewith a hydrogenation component comprising from about 1 to 8 wt. percent nickel material, calculated as metal, and from about 3 to 18 wt. percent tungsten material, calculated as metal, and recovering a hydrocarbon product having a lower boiling range than said hydrocarbon oil feedstock.

8. The process of claim 7 wherein the hydrocarbon product from said hydrocracking zone is passed to a second hydrocracking zone and contacted with a hydrocracking catalyst in the presence of hydrogen and at hydrocracking conditions.

9. The process of claim 8 wherein the catalyst employed in said second hydrocracking zone is a crystalline aluminosilicate zeolite catalyst having hydrogen cations in at least a portion of its exchangeable cationic sites, said zeolite further having uniform pore diameters, a crystal structure that of faujasite, a silica to alumina mole ratio greater than 3 and containing less than about 2 wt. percent sodium, said catalyst having associated therewith a hydrogenation component comprising from about 1 to 8 wt. percent nickel material, calculated as metal, and from about 3 to 18 wt. percent tungsten material, calculated as metal.

10. The process of claim 7 wherein said zeolite catalyst contains a silica-alumina binder.

11. The process of claim 1 wherein the hydrogenation component of said catalyst contains from 6 to 12 wt. percent tungsten material.

12. The process of claim 2 wherein the hydrogenation component of the catalyst contained in the first and second hydrocracking zones contains from 6 to 12 wt. percent tungsten material.

13. The process of claim 7 wherein the hydrogenation component of said catalyst contains from 6 to 12 wt. percent tungsten material.

14. The process of claim 9 wherein the hydrogenation component of the catalyst contained in the first and second hydrocracking zones contains from 6 to 12 wt. percent tungsten material.

15. The process of claim 8 wherein at least a portion of the nickel and tungsten materials of the catalyst employed in said hydrocracking zone is present in a sulfided form.

References Cited
UNITED STATES PATENTS

| | | | |
|---|---|---|---|
| 3,132,087 | 5/1964 | Kelley et al. | 208—60 |
| 3,159,568 | 12/1964 | Price et al. | 208—111 X |
| 3,392,108 | 7/1968 | Mason et al. | 208—111 |
| 3,394,074 | 7/1968 | Buchmann et al. | 208—111 |
| 3,547,807 | 12/1970 | Hansford | 208—111 |
| 3,547,808 | 12/1970 | Hansford | 208—111 |

FOREIGN PATENTS

| | | | |
|---|---|---|---|
| 1,451,019 | 8/1966 | France | 208—111 |
| 1,083,110 | 9/1967 | Great Britain | 208—111 |

DELBERT E. GANTZ, Primary Examiner

G. E. SCHMITKONS, Assistant Examiner

U.S. Cl. X.R.

208—DIG 2, 60, 89, 111